June 4, 1963  M. ROBINS  3,091,958
METHOD AND APPARATUS FOR PRESSURE TESTING AEROSOL CONTAINERS
Filed July 22, 1959  7 Sheets-Sheet 1

INVENTOR.
MILTON ROBINS
BY Steward & Steward
his Attorneys

FIG. 6
FIG. 9

INVENTOR.
MILTON ROBINS

FIG. 10

INVENTOR.
MILTON ROBINS
By Steward & Steward
his Attorneys

FIG. 12

INVENTOR.
MILTON ROBINS
BY Steward + Steward
his Attorneys

United States Patent Office 3,091,958
Patented June 4, 1963

3,091,958
METHOD AND APPARATUS FOR PRESSURE TESTING AEROSOL CONTAINERS
Milton Robins, North Haven, Conn., assignor to Merrill F. Steward, North Haven, Conn.
Filed July 22, 1959, Ser. No. 828,855
10 Claims. (Cl. 73—45.2)

My invention relates to pressure testing, and particularly to a method and apparatus for testing the pressure in containers containing a gas under pressure greater than atmospheric, such as aerosol containers, including such containers wherein such gas is used as a propellant for dispensing liquid or substantially liquid materials. This application is a continuation-in-part of my prior application Serial Number 727,184, filed April 8, 1958, now abandoned.

According to the prior art, the method of testing pressure in such containers has generally been by weighing the pressurized container. With the advent of the use of lighter-than-air gases, as well as gases which are non-condensible at the pressure and temperatures obtaining in the containers, as propellants, however, the weighing method has not afforded a desirably high degree of accuracy since the weight of such gases, even when highly compressed, does not constitute a sufficiently high portion of the total weight of the container to be very significant. Normally encountered variations in the weight of the container itself, for example, become substantial in such cases.

In addition, when the material to be dispensed is of certain types, such as pharmaceutical or food products, it is likely that some of the product may be ejected from the usual valved outlet in the container during testing by conventional procedures, and some of the product may be retained in the valved outlet and deteriorate, or it may solidify there, impairing the operation of the valve.

In the case of pressurized containers used to dispense certain products such as pharmaceutical or food products, it has also been necessary, with prior art methods and apparatus, to perform a separate step of pre-conditioning a container for use to cause a portion of the product to rise into the dip-tube which extends from the valved outlet to a lower portion of the container, in order to insure proper operation of the container by the user. This requires the use of an additional operator, adding to the expense of manufacture.

It is a general object of the present invention to provide a method and apparatus for testing pressure in pressurized containers which is more accurate than methods and apparatus heretofore available.

It is another important object of the invention to provide a method and apparatus for testing pressure in containers which use a compressed gas as a propellant for a liquid or substantially liquid product, whereby release of such product from such container during the test period is rendered unnecessary.

It is a further object of the invention to provide a method and apparatus for testing pressure in containers using a compressed gas as a propellant for a liquid or substantially liquid product and having a dip-tube leading from a valved outlet to the body of liquid product in the container, whereby the rise of such product in such dip-tube may be achieved to an accurately controlled extent during testing.

Still another object of the invention is to provide a completely automatic and reliably positive testing apparatus including means for bringing a plurality of containers to a testing location and transporting them from such location, and means for accurately segregating such containers upon leaving the test station into a first group having a pressure within certain predetermined desired limits and a second group having a pressure outside of said predetermined desired limits.

In accordance with the invention, a method of testing pressure in a container at a given temperature is provided which includes confining a small body of test gas of fixed initial volume at a predetermined initial temperature and pressure. This fixed volume is selected so as to be small in comparison to that of the container. This test gas is then brought into pressure-responsive communication with the gas in the container being tested. The resultant pressure of the test gas is then measured. Under these conditions, such resultant pressure affords an accurate indication of the pressure in such container.

In accordance with another aspect of the invention, the initial pressure of the test gas is maintained within a predetermined range which is related to the pressure desired in a normal tested container so that venting of gas or liquid product from such a normal container is completely prevented or permitted only to an accurately controlled amount during the test.

Thus, when it is desired to prevent the escape of any substantial amount of fluid from a container or along a dip-tube within the container in the course of testing its pressure, the pressure of the test gas is, in accordance with the invention, maintained substantially equal to or greater than the desired pressure in the container.

When, however, it is desired to permit the escape of a closely controlled amount of gas from a container or to permit a closely controlled amount of the product in the container to rise into the dip-tube within the container, the pressure of the test gas is, in accordance with the invention, maintained a predetermined amount less than the desired pressure in the container.

In accordance with another aspect of the invention, pressure-testing apparatus is provided for testing pressure in a container having a valved outlet, which apparatus comprises a test-gas chamber and an adapter head having an opening for communication with the test-gas chamber. Means is also provided for moving the adapter head into gas-tight engagement with the container with the container outlet in communication with the adapter head opening. Means is further provided for admitting a test gas to the test-gas chamber and for closing the chamber after a predetermined desired pressure is established therein. Means is also provided for opening the valved outlet of the container while the adapter head is in such engagement with the container, and also for establishing pressure-responsive communication between the test-gas chamber and the container, and for indicating the resultant pressure in the test-gas chamber at such time.

In accordance with the invention in one form, the container itself is utilized as a closure means for the test-gas chamber. In accordance with the invention in another form, an outlet valve is provided for the test-gas chamber and means is provided for causing the test container to open such outlet valve as the adapter head is moved thereagainst.

In accordance with a still further aspect of the invention, means is provided for testing a series of containers carried by a moving conveyor, in completely automatic fashion, including means for practicing the invention with an intermittent-motion type of conveyor and with a continuous-motion conveyor. Means is also provided, in accordance with this aspect of the invention, for automatically segregating cans having an undesirable amount of pressure.

Additional objects and advantages of the invention will in part become obvious and in part be set forth in the following detailed description, and the scope of the invention will be set forth in the appended claims. The invention is illustrated by several specific embodiments shown in the drawings and described in detail hereinafter.

In the accompanying drawings.

*FIGURES 1–5—Mechanical Apparatus*

Referring first to the form of the invention illustrated in FIGS. 1–5, the invention is shown as incorporated in pressure-testing apparatus including an endless-belt type conveyor 10 adapted to carry a plurality of containers such as containers 11, and to be moved in intermittent fashion by suitable motor driven means, not shown, so as to bring the containers 11 to a test station or position P successively, retaining each such container at the test position for a predetermined period of time. A stationary supporting post 12 (FIG. 2) is provided adjacent the conveyor belt 10 at the position P, and serves to support portions of the testing apparatus including a pneumatic cylinder or air motor 13, having a movable piston, not shown, adapted to move an operating rod 14 outwardly and inwardly of the cylinder 13. The cylinder rod 14 carries a projection 15, and a limit switch 16 (FIG. 3) is fixedly supported in the path of movement of the projection 15 for a purpose to be described. The rod 14 also carries at its outer end a test-head assembly indicated generally at 17, and disposed to engage the container 11 at position P when moved downwardly by the rod 14, in a manner to be described.

Each of the containers 11 includes a dispensing outlet stem 11A which is constructed to operate a valve, not shown, in the container 11 upon inward or tilting movement of the stem 11A with respect to the container 11, all in a conventional manner.

Figures 1, 2, 3, 4:
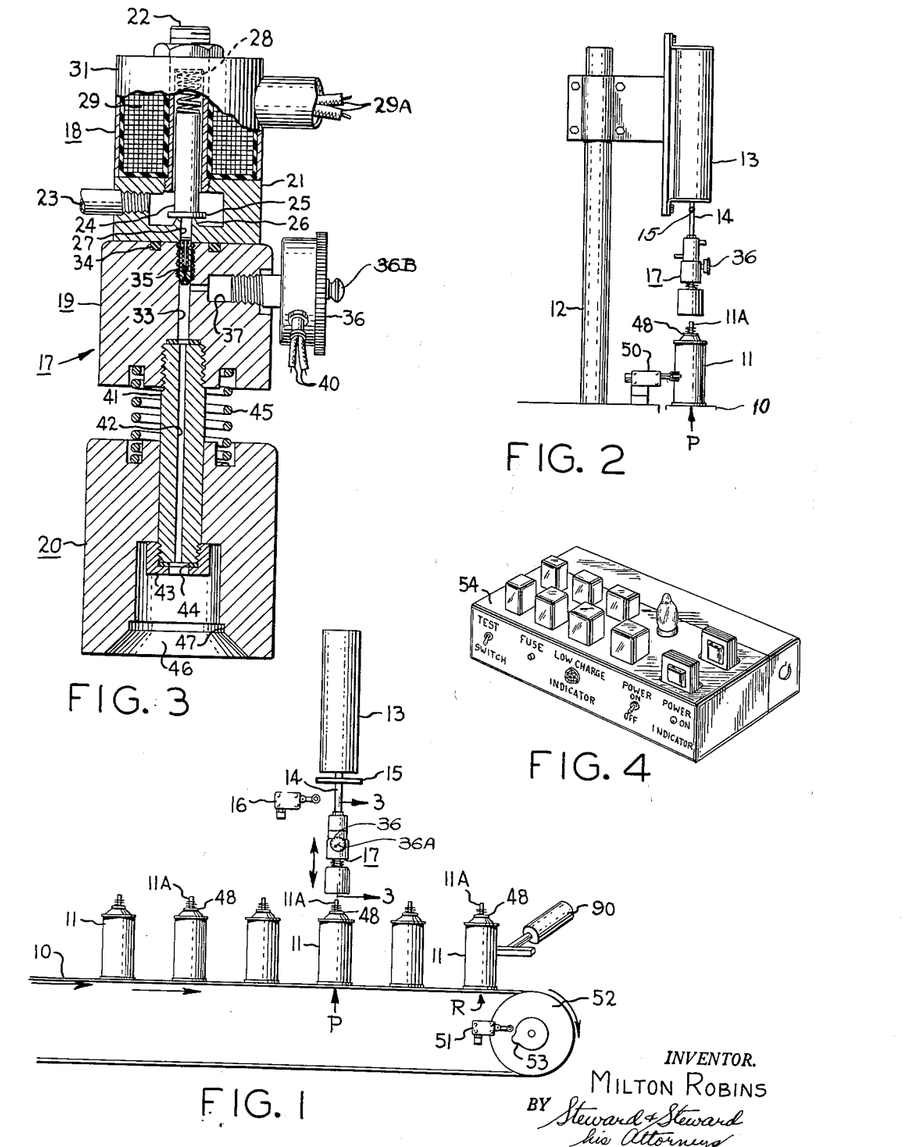
FIG. 1 is a front elevation view in diagrammatic representation of pressure testing apparatus according to the invention in one form.
FIG. 2 is an end elevation view of a portion of the apparatus of FIG. 1.
FIG. 3 is a sectional view of a portion of the apparatus of FIG. 1 taken on the line 3—3 of FIG. 1.
FIG. 4 is a perspective view of electrical control components for use with the apparatus of FIG. 1 in practicing the invention in one form.

Referring now particularly to FIG. 3, the test-head 17 includes three main portions, including an electrically operable solenoid-valve block 18, a test-gas chamber block 19, and a can positioning block or chuck 20.

The solenoid-valve block 18 is of conventional construction and includes a valve block portion 21 having a closed-end hollow stem portion 22, an air inlet 23, and an armature 24 carrying a resilient closure member 25 arranged normally to abut against and close a valve seat 26 to prevent escape of gas pressure through outlet opening 27. Armature 24 is normally biased by spring means 28 downwardly into valve-closing position. For the purpose of opening the valve 18 in response to an external electrical signal, a winding 29 is supported on the block 21 surrounding the stem portion 22, and having externally available terminals 29a. A protective and retaining cover 31 is provided over the winding 29, being held in position by a nut on the outer threaded end of stem 22. As mentioned above, the test-head assembly 17 is fixedly mounted on the end of rod 14 by suitable means, such as by screwing the threaded end of stem 22 into a tapped opening in the end of rod 14.

The test-gas chamber block 19 of the test-head assembly 17 includes a central elongated test-gas chamber 33 extending therethrough and registering with the outlet 27 of block 21, against which the block 19 is retained by suitable means such as by clamping bolts not shown extending through the block 19 and into threaded engagement with the block 21, a resilient sealing ring or O-ring 34 being provided in an annular recess in one of the abutting faces of said blocks to provide a gas-tight seal therebetween.

The test-gas chamber block 19 also includes a check valve 35 of the conventional "bicycle" type in the chamber 33 at the entrance portion thereof adjacent the outlet 27. The block 19 also includes a combined indicating gauge and switch 36 fixedly mounted in an opening 37 communicating with the chamber 33. The gauge-switch 36 includes electrical leads 40, for a purpose to be described.

The block 19 has an integral downwardly extending stem portion 41 having a bore 42 in communication with the chamber 33. Adapter head 20 is slidably mounted thereon and retained by a tapped retainer nut 43 which also serves to hold a resilient seal or O-ring 44 in place. The head 20 is biased downwardly against nut 43 by a compression coil spring 45.

The adapter head 20 is provided at its lower face with a generally frusto-conical recess 46 having an annular groove or shoulder 47, the recess 46 being adapted to fit over the top portion of a can 11, with the shoulder engaging the bead 48 thereof (FIG. 1), thereby accurately positioning the can 11 with respect to the adapter head during the testing operation as will be described.

As further explained hereinafter, chamber 33 and bore 42 together with the passages in and leading to gauge 36 form a testing chamber of constant volume, which volume is relatively small as compared with the volume of the cans undergoing test.

The electrical components of the system are suitably mounted in a separate assembly, as shown in FIG. 4.

For the purpose of automatically segregating cans 11 having an undesirable amount of pressure, a rejection solenoid 90 is provided, fixedly mounted by suitable means, not shown, at a location displaced longitudinally along the conveyor 10 from the test location in the direction of travel of the conveyor. A switch 51 is also provided adjacent the conveyor drive roller 52, which includes a cam 53 adapted to actuate the switch 51. In addition, a "can presence" switch 50 is also provided adjacent the test position (see FIG. 2) and arranged to be closed by a can 11 when in the test position.

*Mechanical Operation of FIGS. 1–4 Form*

In operation, the pressure inlet 23 of the test head assembly 17 is connected to a suitable source, not shown, of compressed gas, such as compressed air, of known temperature, having a pressure slightly below the desired pressure in the containers 11. Cans 11 to be tested, which are at a known temperature, are placed on the conveyor 10 and the conveyor is operated to bring a can into test position P, the can closing the switch 50, and the test-head being in the upper position as shown in FIGS. 1 and 2.

Test operation is initiated by energizing solenoid-valve 18, lifting the valve 25 from the valve seat 26 and admitting air under pressure through valve 35 to the chamber 33. Since the chamber 33 is open, through the bore 42 and recess 46 while the test head is in upper position, the air at this time escapes and no appreciable pressure builds up in chamber 33.

The test head is then lowered by operation of a solenoid to be described, the recess 46 receiving the upper portion of the can 11 and the bead 48 seating in the annular groove 47, arresting the downward motion of the block 20.

Continued downward motion of the test head assembly 17 compresses the spring 45, the block 20 sliding on the stem 41. As this occurs, the O-ring seal 44 grips the outlet stem 11a of the can 11, thereby closing off the chamber 33, causing pressure to build up therein to the line air pressure, which, as noted above, is less than the desired pressure in the containers 11. This pressure acts upon the gauge pressure switch 36, causing it to move a pointer 36A toward, but short of, a pre-set switch-closing position. Such position is determined by manual adjustment of knob 36B (FIG. 3). Thereafter, the head 17 moves further downwardly a small amount and the stop 15 on the rod 14 engages the operating member of the limit switch 16. The last portion of the downward movement of the head 17 also acts to depress the stem 52 of the container 11, thereby opening the valve sufficiently to effect communication between the interior of can 11 and the chamber 33. Since the can pressure is higher, and since the test chamber volume is relatively small, a significant pressure rise is indicated at gauge 36, check valve 35 preventing the escape of this pressure back to the air supply line.

If the pressure in the container 11 being tested is up to the desired minimum pressure preselected by the setting of knob 36B, the pressure in the chamber 33 increases enough to move pointer 36A of the gauge 36 to switch-closed position, preventing a can-rejection circuit from being set up, in a manner to be described.

After the expiration of a predetermined time delay, the test head assembly 17 is moved upwardly, allowing the valve of the container 11 to close. The conveyor thereafter moves the containers 11 along to bring the succeeding container into test position, and the process is repeated.

If the pressure in the container 11 being tested is below the aforesaid desired minimum, the contacts of the pressure gauge 36 do not move to closed position, and this failure of the switch contacts to close allows the rejection circuit to be energized. This effects a "fail safe" operation of the apparatus. The rejection circuit operates, after a predetermined timed delay for the purpose of allowing the undesirable can to reach a "reject" position R (FIG. 1), to energize the rejection solenoid 90 which ejects the undesirable container from the conveyor.

*Electrical Circuitry of the FIGS. 1–5 Form*

The electrical components of the system of FIGS. 1–6, which are not a part of the test head, reject station or conveyor, are preferably mounted in a separate chassis 54, see FIG. 4, as aforesaid. The circuitry and operation of the electrical controls will be understood from the wiring diagram, FIG. 5, and the time-sequence diagram FIG. 6. The electrical circuitry will be described first, with reference to FIG. 5, and the operation thereof will be described thereafter, with reference to both FIGS. 5 and 6.

Figure 5:
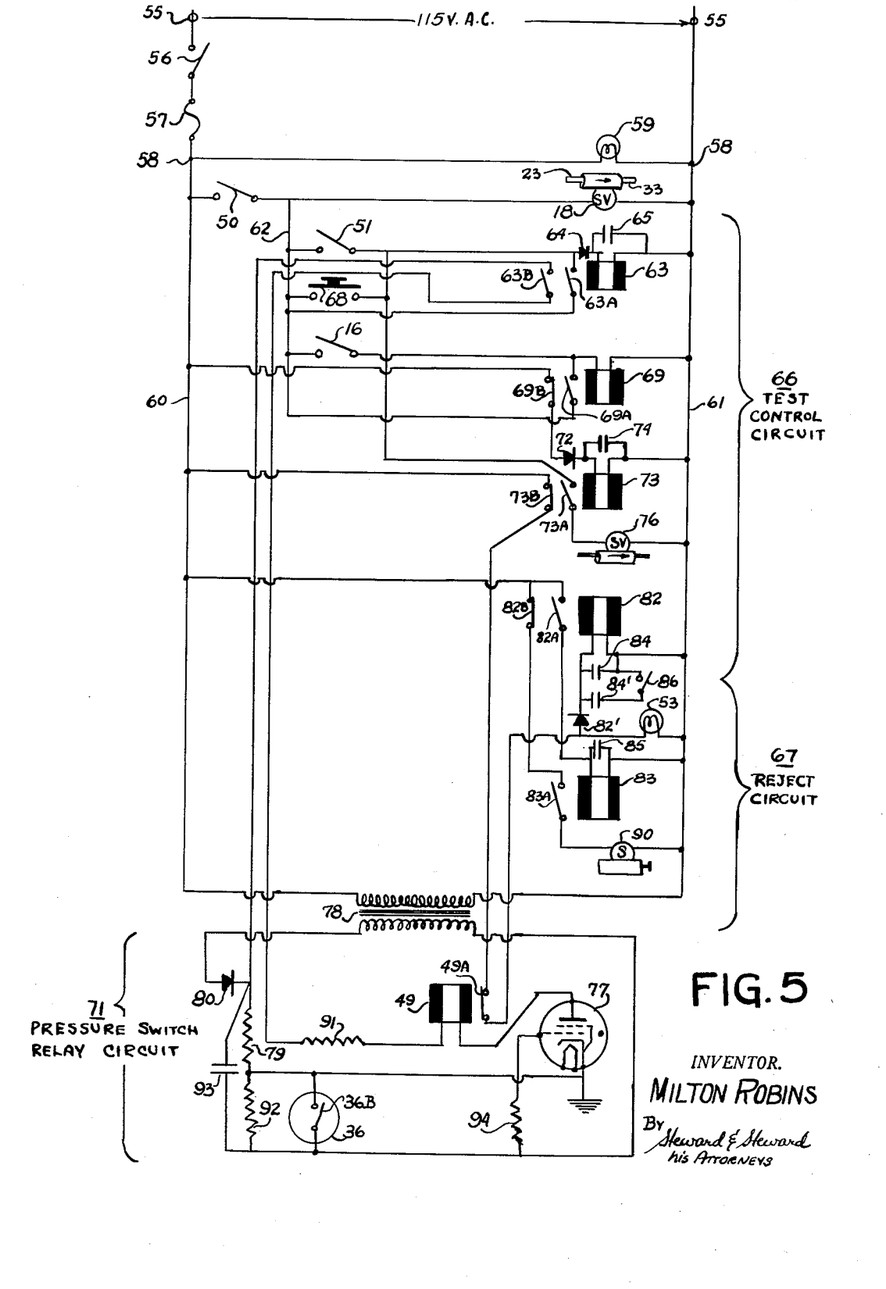
FIG. 5 is a schematic diagram of the electrical control circuitry of the invention in one form.

Referring to the wiring diagram, the circuit includes a pair of terminals 55 for connection to a source of electrical potential, not shown, such as 115 volts, 60-cycle A.C., connected in series with main power busses 60, 61. A power-on indicating light 59 is connected across the busses 60, 61 to show when the circuit is energized.

The remaining circuitry includes three main portions: (1) a test-control circuit 66, (2) a rejection circuit 67, and (3) a pressure switch relay circuit 71.

The test control circuit 66 includes solenoid-valve 18 which is connected in series with the can-presence switch 50, across the busses 60, 61. A sub-bus 62 is connected between the switch 50 and the solenoid-valve 18, to be energized whenever the switch 50 is closed. The cam-switch 51 is connected in series with a rectifier 64 and a cam-switch relay 63, between the sub-bus 62 and the bus 61, the relay 63 being provided with a capacitor 65 connected across its terminals to provide a time-delay opening action.

The cam-switch relay 63 is provided with a pair of normally-open contacts 63A shunting the cam switch 51, and a pair of normally-open contacts 63B, in series with a relay 49 in the plate circuit of a thyratron tube 77 in the pressure switch relay circuit 71.

A solenoid-valve 76, which controls the admission of air to the test-head movement cylinder 13, is connected between the sub-bus 62 and the bus 61, in series with the contacts 63A, and also in series with contacts 73A, actuated by a relay 73 to be described.

A "test" push-button switch 68 is also connected across cam switch 51 to permit testing of the operation of relay 63 during preparation of the apparatus for normal operation and for locating malfunctions in the system.

A test head "down" position relay 69 is also connected between the sub-bus 62 and the bus 61, in series with the "down" position limit switch 16, and this relay is provided with a pair of contacts 69A shunting the switch 16.

The test control circuit 66 further includes a delayed opening relay 73, connected in series with a rectifier 72 and a pair of normally-closed contacts 69B operated by relay 69, across the main busses 60, 61. The relay 73 is provided with a capacitor 74 connected across its terminals to provide a time-delay-opening action.

The rejection circuit 67 includes a first delayed-opening relay 82, connected in series with a pair of normally-closed contacts 49A operated by relay 49, and a pair of normally-closed contacts 73B, operated by relay 73, between the main busses 60, 61.

Relay 82 is provided with a capacitor 84 connected across its terminals and a series-connected rectifier 82' to provide a time-delay opening action. A second capacitor 84' is connected in series with a switch 86 also across the relay 82, to provide optional additional time-delay-opening action upon manual closing of switch 86. Indicator light 53 is in parallel with relay 82 and provides a visual indication of a "reject" condition in the circuit.

The rejection circuit further includes a second time-delay-opening relay 83, connected in series with normally-open contacts 82A, operated by relay 82, across the main busses 60, 61, and has a capacitor 85 connected across its terminals to provide a time-delay opening action.

The capacitors 65, 74, 84, 84', and 85 are preferably made variable or readily replaceable to permit accurate setting of the time-delay opening action of relays 63, 73, 82, and 83 respectively.

Also included in the rejection circuit is the rejection solenoid 90, previously mentioned, connected in series with normally-open contacts 83A, operated by relay 83, and normally-closed contacts 82B, operated by relay 82, across the main busses 60, 61.

The pressure switch relay circuit 71 includes the thyratron 77, having the relay 49 in its plate circuit, in series with resistor 91 and normally-open contacts 63B of relay 63. The D.C. plate voltage for thyratron 77 is obtained from transformer 78, connected across the main busses 60, 61, by rectification through selenium rectifier 80 and the filter capacitor 93, applied across the bleeder resistors 79 and 92. The cathode-drop across resistor 92 is applied as bias to the control grid of the thyratron to bias the tube normally to "cut-off" and thus prevent the thyratron from "firing." The gauge-pressure switch 36 is connected in shunting relation to the resistor 92 so that when switch 36B is closed, the resistor 92 is short-circuited, and the bias on the control grid is reduced and conduction through the tube occurs, the resistor 94 being included in the grid circuit at all times to limit grid current.

*Electrical Operation of the Form of FIGURES 1–6*

Figures 6, 9:
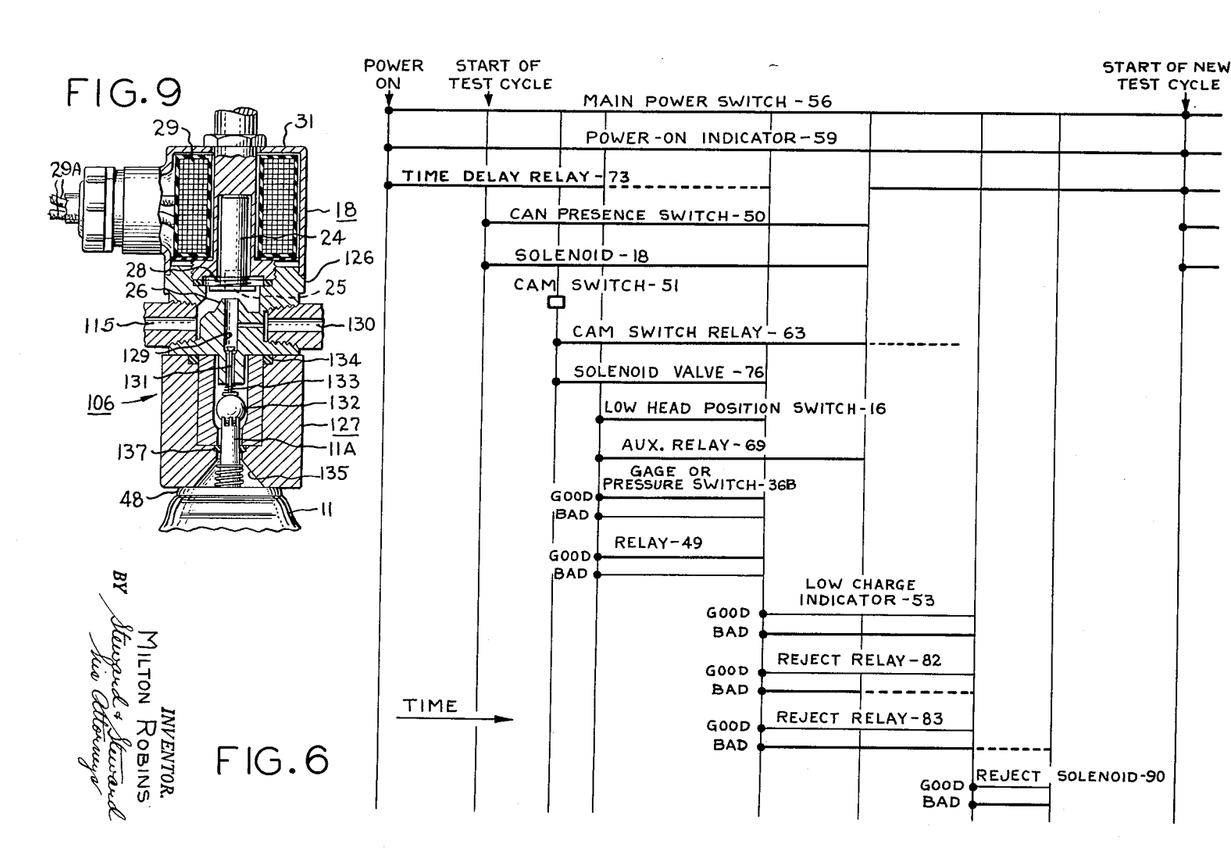
FIG. 6 is a time-sequence chart of the operation of the system according to FIGS. 1–5.
FIG. 9 is a fragmentary sectional view of the test-head of the apparatus of FIG. 7 in which the head is shown in "test" position on a container.

The operation of the electrical circuitry of the form of FIGS. 1–6 will be understood from a consideration of the wiring diagram of FIG. 5 in conjunction with the time-sequence chart of FIG. 6, and the following detailed description.

The operation cycle of the system may be conveniently considered in eight steps or stages, as indicated in FIG. 6:

*Stage 1—Main power switch 56 closed.*—The power-on indicator 59 is energized, and time-delay-opening relay 73 is energized, closing normally-open contacts 73A in test control circuit 66 and opening normally-closed contacts 73B in rejection circuit 67. Nothing further occurs until the conveyor 10 delivers a can to be tested to the test position P, closing can-presence switch 50.

*Stage 2—Can-presence switch 50 closed.*—Solenoid-valve 18 is energized, admitting line air pressure to test-head 17 through check valve 35. Since the test-head is normally in the raised position, the chamber 33 is open, and no appreciable pressure builds up therein at this time. Nothing further occurs until the cam-switch 51 closes.

*Stage 3—Cam-switch 51 closed.*—Cam-switch relay 63 is energized, closing contacts 63B in the thyratron plate circuit, and by-pass contacts 63A are also closed simultaneously. Solenoid-valve 76 controlling the downward movement of the test-head 17 is energized, since normally-open contacts 73A have previously been closed by operation of relay 73. The test-head 17 is thereupon moved downward by the cylinder 13, toward its low position, the block 20 contacting the can 11, and the stem of the container closing the chamber 33 as described above, permitting pressure to build up in chamber 33. The build-up of pressure in chamber 33 moves the gauge switch 36B toward but short of closed position.

Immediately after the pressure builds up in chamber 33 as described, continued downward movement of the test-head opens the valve of the container 11 and permits pressure-responsive communication between the container and the chamber 33. If the pressure in the container being tested is up to a predetermined desired minimum, switch 36B is closed and the rejection circuit is disabled by the opening of normally-closed contacts 49A by relay 49. If the pressure is not up to minimum, switch 36B remains open, allowing the contacts 49A to remain closed.

At substantially the same time that the container valve is opened, the low-head-position limit switch 16 in test control circuit 66 is closed.

*Stage 4—Switch 16 closed.*—Closing switch 16 energizes auxiliary relay 69 which closes by-pass contacts 69A, and also opens normally-closed contacts 69B in series with the time-delay-opening relay 73. This starts a time-delayed opening action of the relay 73. This time-delay serves to allow time for the fluid in the container, if any, to move partly up into the dip-tube, and this time may be closely controlled by varying capacitor 74.

*Stage 5—Relay 73 drops out.*—As relay 73 opens, it causes a "reading" to be taken of the pressure condition in chamber 33 which is indicative of that in the container 11 being tested. Thus if the pressure in the container is such that the resultant pressure in chamber 33 causes the contacts of the gauge switch 36B to close, contacts 49A are open at the time relay 73 drops out, so that even though contacts 73B again close, relay 82 is not energized.

If the pressure in the container is too low, the contacts 49A remain closed at the time relay 73 drops out, and since contacts 73B close, relay 82 is energized. The low-pressure indicator light 63 then lights, indicating a "bad" can. At the same time, when relay 73 drops out, it opens normally-open contacts 73A in series with solenoid-valve 76, reversing the hold-down pressure in cylinder 13, and the test-head 17 is returned to its upper position by the piston, not shown, in cylinder 13.

Still assuming that the pressure of the container 11 being tested is too low and relay 82 is energized, this relay immediately closes contacts 82A in series with relay 83, closing this relay also. This condition of the circuit remains until the conveyor moves the container 11 being tested from test position P, at which time the can-presence switch 50 opens.

*Stage 6—Switch 50 open.*—The opening of switch 50 removes power from the sub-bus 62, which drops out relay 69. The opening of relay 69 allows normally-closed contacts 69B to return to closed condition. This allows relay 73 to reclose, opening contacts 73B in series with relay 82, and starting a time-delayed opening action of this relay. This time-delay is provided to allow time for the container to reach the "reject" position.

The opening of switch 50 also removes power from air solenoid-valve 18, deenergizing this solenoid, and disconnects cam-switch relay 63, allowing contacts 63A and 63B to return to their normally-open condition after a short delay produced by capacitor 65.

*Stage 7—Relay 82 drops out.*—When relay 82 drops out, it again opens contacts 82A in series with relay 83, starting a time-delayed opening of this latter relay. At the same time, contacts 82B are returned to their normally-closed condition. Since contacts 83A are still closed because of the delayed opening of relay 83, the circuit to "reject" solenoid 90 is completed at this time, and it operates to eject the undesired container from the conveyor which by this time has traveled to reject station R.

*Stage 8—Relay 83 drops out.*—When relay 83 drops out, it deenergizes reject solenoid 90 by opening normally-open contacts 83A, and the circuit returns to a "ready" condition, in which nothing further occurs until the conveyor delivers another can to be tested to the test position, closing can-presence switch 50, and starting another test cycle with the circuit in the same condition as at Stage 2 above.

*FIGURES 7–12.—Mechanical Apparatus*

The form of apparatus in FIGS. 7–12 includes components corresponding generally to those in FIGS. 1–6. In FIGS. 7–12, however, a conveyor 100, carrying the cans 11 to be tested, is provided which is continuously moving, the gauge-switch 361 is provided with two stationary contacts, and the circuit serves to cause rejection of containers having too high pressure, as well as those having too low pressure.

Figures 7, 8:
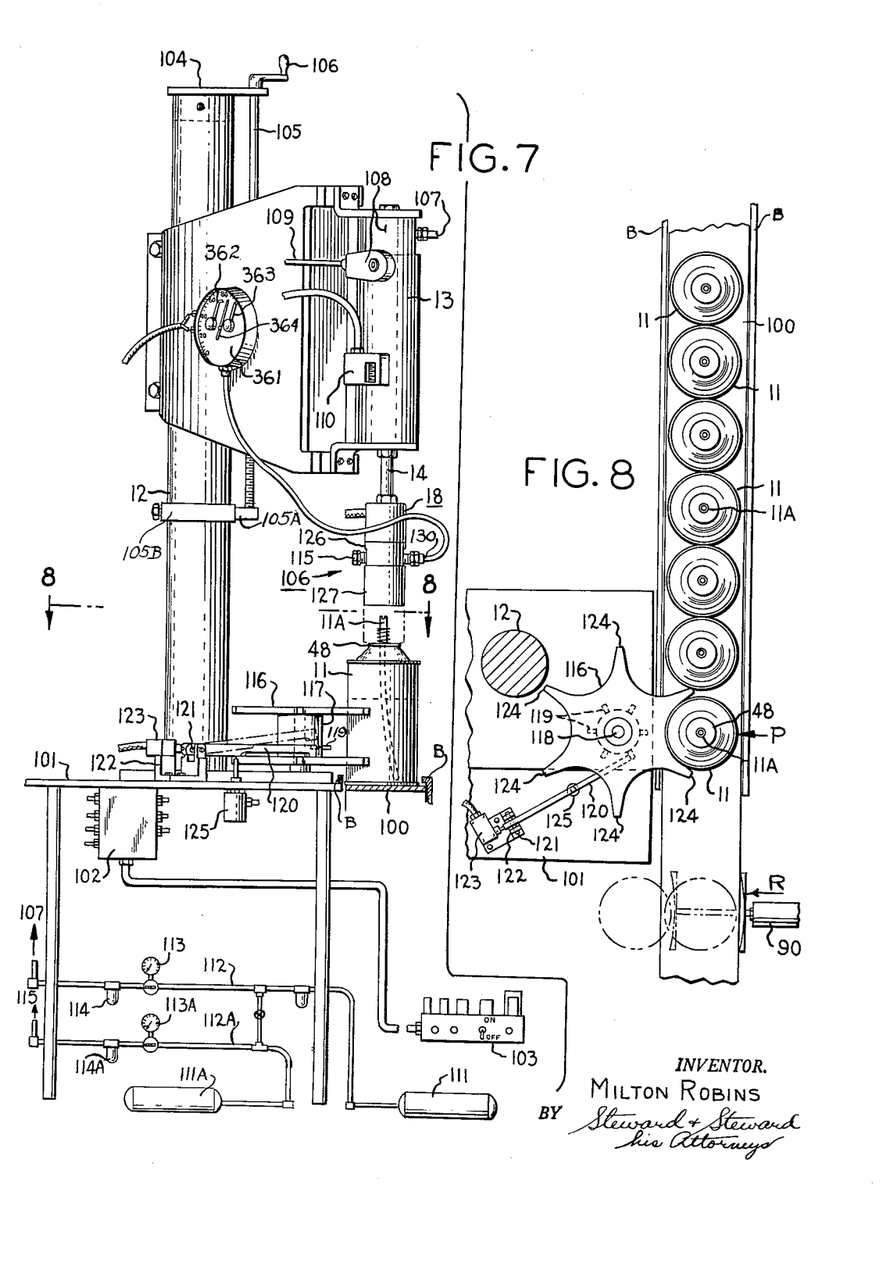
FIG. 7 is a side elevation view of pressure-testing apparatus according to a second form of the invention.
FIG. 8 is a fragmentary plan view, partly in section, of the apparatus of FIG. 7, taken generally on the line 8—8 of FIG. 7.

In this form, the supporting post 12 is supported on a work table 101 adjacent the conveyor 100, which table also serves to support a junction box 102 to facilitate the connection of the control wires from the electrical control chassis 103. The test-head movement cylinder 13 is supported on the post 12, and an initial height control is provided including a cap 104 fixedly mounted on the top of post 12, and a threaded adjusting rod 105, adapted to be rotated by means of a handle 106 and having a threaded engagement with the supporting bracket of cylinder 13. The lower end of rod 105 is supported in a cup or sleeve 105A carried by a clamp 105B fastened to post 12.

The cylinder 13 includes a movable piston, not shown, adapted to move an operating rod 14 outwardly and inwardly of the cylinder 13. The rod 14 carries at its outer end a test-head assembly 106 which is disposed to engage the container 11 at position P when moved downwardly by rod 14, similar to the arrangement in the foregoing example.

The cylinder is provided with an air inlet 107 and a solenoid-valve portion 108 adapted to control the admission of air pressure from inlet 107 to the cylinder 13, and having lead wires 109, connected in a manner to be described.

The cylinder 13 is also provided with a pressure-responsive switch 110, for a purpose to be described.

A compressed-air source is provided, including a compressed air storage tank 111, connected through line 112 including reducer 113 and filter 114, to the air inlet 107 of the cylinder 13. Similarly, there is provided a compressed gas storage tank 111A, connected through line 112A, reducer 113A and filter 114A to the gas inlet 115 of test head 106.

In order to control the travel of the cans 11 on the continuously-moving conveyor 100, apparatus is provided including a star-wheel 116, comprising two vertically spaced star gears connected by a hub portion 117, rotatably supported on a vertical shaft 118.

The hub 117 of the star wheel 116 is provided with a number of stop projections 119 adapted to engage the end of a pawl 120, which in turn is slidably and pivotally supported by an elongated aperture therein on a pivot pin 121 carried by support bracket 122 on the table 101. A miniature switch 123, or "can-presence switch," is also supported on the bracket 122 and is adapted to be actuated by endwise movement of the pawl 120.

Referring to FIGURE 8, when a can 11 is moved by the continuously running conveyor along its direction of travel, the can engages one of the cusps 124 of the star wheel 116, and rotates it in a clockwise direction as viewed. This brings one of the stops 119 into engagement with the end of the pawl 120, moving it endwise toward the switch 123, the end of the pawl 120 engaging and actuating the switch 123, the pawl being in its lower, solid-line position at this time (FIG. 7). An abutment or rail B at the side of conveyor 100 holds each can in engagement with star-wheel 116, and since the latter is intermittently prevented from turning, the can is held at station P while the conveyor continues to run, the belt simply skidding along under the cans back of station P.

For the purpose of releasing the pawl 120 from a stop 119, thereby permitting the star-wheel to rotate or "index" to a succeeding position in which a succeeding can 11 is brought into test position P, an "index-solenoid" 125 is provided, mounted on the underside of the table 101, to serve as a stop to determine the vertical position of the pawl 120. When solenoid 125 is in the de-energized condition, its actuator maintains the pawl 120 in a generally horizontal position, where its end may be engaged by one of the stops 119. When the solenoid 125 is energized, its actuator lifts the pawl 120 to the position indicated in dotted lines in FIG. 7, allowing a stop 119 to pass, whereupon the solenoid 125 is immediately de-energized, dropping the pawl 120 and stopping the star-wheel at its next position, thereby permitting the star-wheel to "index" one position.

The construction of the test-head 106 is shown in detail in FIG. 9, and includes solenoid-valve portion 18, test-gas chamber block 126, and a can-engaging portion or adapter block 127.

The solenoid valve portion, shown in energized condition in FIG. 9, includes the portions previously described, including a winding 29, a cover 31, a plunger 24, and a plunger bias spring 28. The plunger 24 carries a resilient valve closing member 25, adapted to seat against valve seat 26, to control the admission of gas through gas inlet 115 into the test-gas chamber 129. The test-gas chamber 129 is connected to pressure gauge-switch 361 through a suitable conduit 130. The gauge-switch 361 is generally similar to the gauge 36 described above, except that it is provided with a pair of stationary contacts 362 and 363 (FIG. 7) connected electrically in common. As will be described, the pressure in a container being tested must be such as to cause the movable contact 364 of the gauge-switch 361 to remain out-of-contact with both stationary contacts in order to be acceptable. The stationary contacts 363 and 362 of the gauge-switch 361 may therefore be regarded as a "high-reject" and a "low-reject" contact, respectively, the acceptable range lying therebetween. Both the high-reject and low-reject contacts are preferably made adjustable so that the acceptable range may be readily varied as desired.

The test-gas chamber 129 is normally closed interiorly by valve means including a poppet valve 131 which is actuated by a ball 132, the ball and valve 131 being normally biased to closed position by means of spring 133.

The test-head 106 assembly further includes an adapter head portion 127 rigidly attached to the test-gas chamber block 126 by suitable means such as by bolts, not shown, with a suitable gasket or O-ring 134 therebetween. The adapter block 127 is provided with a generally frusto-conical recess 135, and a second resilient O-ring 137 for engaging the container stems, as before.

*FIGURES 7-12—Mechanical Operation*

Referring to FIGS. 7-10, actuation of the solenoid-valve 18 admits compressed gas to the test-gas chamber 129 of test-head 106. Since the test-gas chamber 129 is normally closed by valve closure 131, pressure builds up in the chamber 129. Electrical circuitry, to be described, then actuates the cylinder solenoid-valve 108, admitting compressed air to cylinder 13, which causes the operating rod 14 to be moved downwardly. The presence of a can 11 at position P to be tested is assured by the closure of can-presence switch 123. As the test-head 106 descends, the adapter-head 127 receives the valve outlet stem 11A of the container 11, the O-ring 137 sealing around the stem. Immediately after this, the upper lip of stem 11A engages the ball 132, raising the closure 131, and opening the test chamber 129 to provide communication with the interior of stem 11A. Slight continued downward movement of the test-head 106 depresses the valve stem 11A, establishing pressure communication between the can 11 and the test-gas chamber 129.

In this form of the invention, the pressure in the test-gas chamber is initially maintained slightly higher than the desired pressure in the can 11, but again the capacity or volume of chamber 129 is small as compared to that of a can undergoing test, so that when pressure communication is established between the test chamber and the can, the resultant pressure is essentially that of the can. Assuming that the pressure in the can 11 is within the desired limits, the resultant pressure in chamber 129 after communication with the container 11 drops to a level slightly less than the initial pressure, causing the movable contact 364 of gauge 361 to come to an open-circuit condition between the two stationary contacts 362, 363, thus failing to operate a rejection circuit. If the pressure in the can 11 being tested is outside of the predetermined desirable limits, the resultant pressure in chamber 129 causes the movable contact 364 to engage either the "maximum" or "minimum" limit settings of adjustable contacts 363, 362, thus producing a signal which is fed to the rejection memory circuit. After a time delay to allow the test-head to move upwardly and the can to travel to reject position R, this reject signal is used to reject the faulty can from the conveyor line.

*FIGURES 6-10—Electrical Circuitry*

Figure 10:
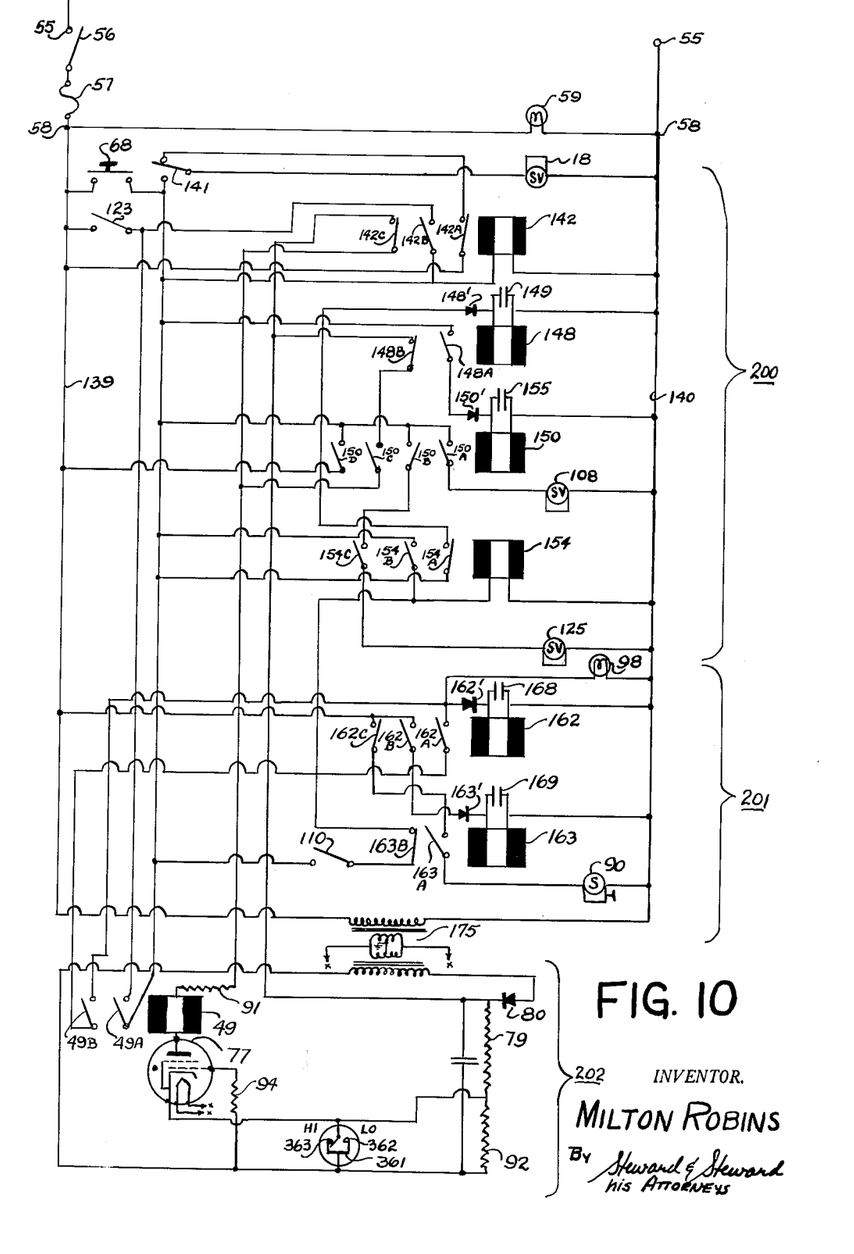
FIG. 10 is a schematic wiring diagram of the electrical control circuitry used in conjunction with the apparatus shown in FIGS. 7–9.

Referring to the wiring diagram of FIG. 10, the circuit of this form of the invention includes terminals 55 for connection to a suitable power source such as 110 volts, 60-cycle, A.C., main power switch 56 in series with a suitable fuse 57, and terminals 58 having a power-on indicator 59 connected therebetween.

A pair of main power busses 139 and 140 are connected to the terminals 58, to be energized upon the closing of switch 56.

The remaining portions of the circuit include three main parts, (1) a test-control circuit 200, (2) a rejection circuit 201, and (3) a pressure-switch relay circuit 202.

Test control circuit 200 includes solenoid-valve 18 controlling the admission of test or preload gas pressure to the test-head 106 and test-gas chamber 129. The solenoid circuit of valve 18, in one condition of the circuit arrangement, is connected directly across the busses 139 and 140 in series with a pair of normally-closed contacts 142A operated by a relay 142 to be described and a manually operated single pole double throw switch 141. In its alternate position, switch 141 connects solenoid 18 to a sub-bus 146 for energization only when that bus is "hot."

Relay 142 in turn is connected between main busses 139 and 140 in series with a pair of normally-open contacts 49A, operated by relay 49 to be described, and can-presence switch 123. Relay 142 serves to operate contacts 142A, referred to above, contacts 142B, shunting the contacts 49A, both in test control circuit 200, and also contacts 142C, in series with the relay 49 in pressure switch relay circuit 202.

Sub-bus 146 is connected at a point between the contacts 49A and the relay 142, to be energized whenever the switch 123 and contacts 49A, or by-pass contacts 142B, are closed. This sub-bus is also energized by the closing of shunt contacts 150D, under the control of relay 150, connected directly between main and sub-busses 139, 146, respectively, for a purpose to be described hereinafter.

Test-control circuit 200 also includes a delayed opening relay 148, connected between the main bus 140 and sub-bus 146, in series with normally closed contacts 154A, operated by relay 154 to be described. Relay 148 is provided with a capacitor 149 connected across its terminals and a rectifier 148' to provide a time-delayed opening action.

The test-control circuit also includes a third relay 150, also of the time-delayed opening type, connected between the main bus 140 and the sub-bus 146, in series with a pair of normally-open contacts 148A, operated by the relay 148. Relay 150 is also provided with a capacitor 155 connected across its terminals, and a series rectifier 150', to provide a time-delayed opening action.

Solenoid-valve 108, controlling the reciprocation of test-head 106, is also connected between the main bus 140 and sub-bus 146, in series with a pair of normally-open contacts 150A, operated by relay 150. Solenoid valve 108 controls the admission of air to the cylinder 13, to cause test-head 106 to be moved down.

Test control circuit 200 also includes a relay 154, connected in series with pressure-switch 110 and a pair of normally-closed contacts 163A, between the main bus 140 and sub-bus 146. The relay 154 serves to operate three pairs of contacts as follows: (a) normally-closed contacts 154A in series with relay 148; (b) normally-open contacts 154B, shunting the switch 110 and contacts 163B in series with relay 154; and (c) normally-open contacts 154C in the circuit of index-solenoid 125. Index-solenoid 125 is connected in series with normally-closed contacts 150B, operated by relay 150, as well as the aforesaid contacts 154C, between the main bus 140 and sub-bus 146.

Rejection circuit 201 includes a "bad container" indicator light 98 connected in series with normally-open contacts 49B operated by relay 49 in the pressure switch relay circuit, and normally-open contacts 154A, or switch 110 and contacts 163B, between main bus 140 and sub-bus 146.

The rejection circuit also includes a time-delay-opening relay 162, connected in parallel with indicator light 98. Relay 162 is provided with by-pass, normally-open contacts 162A, shunting contacts 49B. In addition, relay 162 is provided with a capacitor 168 and a series rectifier 162', to provide a time-delayed opening action.

The rejection circuit further includes a second relay 163, connected in series with a rectifier 163' and normally-open contacts 162B, between the main busses 140 and 139. The relay 163 includes a capacitor 169 connected across its terminals to provide delayed opening of the relay.

Pressure switch relay circuit 202 is generally similar to that of the previous form, excepting that the contacts 63B of the previous form are replaced by contacts 142C of relay 142 as noted above, and these contacts are shunted by the series combination of contacts 148B, operated by relay 148, and contacts 150C, operated by relay 150.

*FIGURES 7–12—Electrical Operation*

*Stage 1—Main power switch 56 closed.*—Closing main power switch 56 applies power across the main busses 139 and 140, energizes the "power on" indicator 59, and actuates the test pressure preload solenoid-valve 18. It is here assumed that switch 141 is in such position as to connect solenoid 18 to main bus 139 through contacts 142A. Solenoid-valve 18 opens to admit test gas into chamber 129.

*Stage 2—Gauge-switch 361 closed.*—Since the chamber 129 is normally closed by valve 131, pressure builds up in this chamber to normal line gas pressure, which, in this form, is maintained slightly higher than the desired can pressure and which therefore moves contact 364 of gauge-switch 361 into closed position with contact 363, the high or over-pressure position.

The closing of contacts 363, 364 at this time energizes relay 49 through the thyratron 77 as previously explained. The relay 49, in turn, closes normally-open contacts 49A in series with relay 142 in test circuit 200, and also contacts 49B in series with relay 162 in reject circuit 201. Since can-presence switch 123 is still open, however, these relays are not actuated. Nothing further occurs therefore until the conveyor delivers a can to be tested to the test position, closing the can-presence switch 123.

*Stage 3—Can-presence switch 123 closed.*—The closing of switch 123 delivers power through the contacts 49A (previously closed) to the test control circuit sub-bus 146, and closes relay 142. When relay 142 is energized, it performs the following three functions: (1) it opens normally-closed contacts 142A, de-energizing the solenoid-valve 18 and closing off the test-gas chamber 129 from the gas supply line, trapping a fixed volume of test gas in the chamber; (2) it closes normally-open contacts 142B, by-passing contacts 49A, and (3) it de-energizes the gauge relay 49 by opening normally-closed contacts 142C in the thyratron plate circuit.

When the sub-bus 146 is energized, it delivers power to relay 148, closing this relay. Relay 148 in turn opens normally-closed contacts 148B in the thyratron plate circuit for a purpose to be described. At the same time, relay 148 also closes normally-open contacts 148A, energizing relay 150 which in turn closes normally-open contacts 150A, energizing the solenoid-valve 108 of test-head actuating cylinder 13, starting downward movement of the test-head assembly. Relay contacts 150B in the circuit to index-solenoid 125 are opened, and relay contacts 150C in the thyratron plate circuit are closed, at this time also. Also closed are contacts 150D, thus connecting sub-bus 146 directly to main bus 139. This is done to eliminate any chance of erratic or intermittent operation of the system due to momentary opening of can-presence switch 123. The latter may occur as the can is "jostled" slightly by engagment of the star wheel 116 or the descending test-head 106. Shunt contacts 150D ensure that a complete test cycle will take place, regardless of the condition of switch 123 after it once closes.

*Stage 4—Pressure switch 110 closed.*—When the test-head assembly reaches its lowest position and contacts the can 11, its travel is stopped, and the pressure in the cylinder thereupon builds up to the applied line pressure, closing the switch 110. The closing of switch 110 initiates the actual pressure evaluation process by energizing relay 154 through contacts 163B which are still closed. Relay 154 by-passes the switch 110 by closing normally-open contacts 154B. Relay 154 also starts a predetermined time-delayed opening action of the relay 148 by opening contacts 154A.

*Stage 5—Relay 148 drops out.*—After a predetermined time-delay to allow time for pressure conditions in the can 11 and the test-chamber 129 to reach a stable condition (which time may be varied in accordance with the viscosity of the fluid, if any, in the container), relay 148 drops out. The opening of relay 148 closes contacts 148B in the thyratron plate circuit, and at the same time, opens contacts 148A in series with relay 150. Since relay 150 also has a time-delay opening action, however, it remains closed for a short time after 148 drops out, maintaining contacts 150C closed. Thus at this time, the plate circuit of the thyratron is complete.

If the resultant pressure in the chamber 129 is within the predetermined desired limits, the movable contact 364 of the gauge 361 will at this time be out of contact with both contacts 362, 363, and the thyratron will be prevented from firing. If the resultant pressure is outside of these limits, either on the high of low side, however, the contact of the gauge-switch 361 will be closed, removing the blocking bias from the thyratron and allowing it to fire. Firing of the thyratron energizes the relay 49.

Assuming, therefore, that the pressure in the container is undesirably high or low, and that the circuit through gauge-switch 361 is closed and relay 49 energized, this relay again closes the contacts 49B, and energizes a rejection indicator 98, and a time-delay opening relay 162, both in rejection circuit 201.

Relay 162 at the same time closes normally-open contacts 162A, by-passing the contacts 49B, and also closes contacts 162B, energizing a second time-delay opening relay 163. Relay 162 also opens normally-closed contacts 162C, in series with the reject solenoid 90.

When relay 163 is energized, it closes normally-open contacts 163A, also in series with the reject solenoid 90. Contacts 163B provide an important feature of the system in that they prevent immediate initiation of a second test cycle where the preceding test has indicated a faulty container, thereby delaying further tests until the rejection of the faulty container has taken place. Otherwise, however, so long as a container tests "good," the system is immediately released to start testing a succeeding container without waiting for the expiration of the time lapse between testing and rejection involved in the case of faulty containers. Thus the system is so designed as to "assume" that the containers will test good, and thus not penalize its capacity by slowing up every test cycle to allow for a rejection.

Nothing further occurs in the circuit until the time-delay 150 expires and it drops out.

*Stage 6—Relay 150 drops out.*—When relay 150 drops out, it opens normally-open contacts 150A, in series with the solenoid 108, thereby reversing the pressure on the piston in cylinder 13 of test-head assembly 106, and raising the test-head to its upper position. The opening of relay 150 also allows contacts 150B to return to their normally-closed condition, energizing the index solenoid 125 (since contacts 154C are still closed) to raise pawl 120 releasing star-wheel 116 for rotation by on-coming cans on conveyor 100. Opening of relay 150 also opens normally-open contacts 150C in the thyratron plate circuit, de-energizing the relay 49. The release of pressure in the cylinder 13 also allows the pressure switch 110 to return to its normal open condition. Since the switch 110 is by-passed by contacts 154B of relay 154, however, this produces no other change in this circuit at this time. Finally, contacts 150D are also opened at this time, returning the sub-bus 146 to control solely by can-presence switch 123.

Nothing further occurs in the circuit until the can 11 is actually moved by the conveyor away from the test position, allowing the can-presence switch 123 to open.

*Stage 7—Can-presence switch is open.*—Opening of the can-presence switch 123 removes power from the sub-bus 146. This de-energizes the relay 142 which has the effect of returning the test control circuit to its initial or "ready" condition by (1) reclosing normally-closed contacts 142A in series with solenoid 18, (2) reopens normally-open contacts 142B, and (3) reclosing normally-closed contacts 142C in the thyratron plate circuit.

Removing power from the sub-bus 146 also, of course, de-energizes relay 154, which drops out immediately, closing contacts 154A, and opening contacts 154B, 154C. Power is also removed from that portion of the rejection circuit 201, which includes indicator 98 and relay 162.

The removal of power from the relay 162 starts a time-delayed opening action of this relay. This time delay is for the purpose of allowing the can 11 to travel from test position P to reject position R.

Finally, removal of power from the sub-bus 146 also de-energizes the index-solenoid 125, allowing pawl 120 to fall into position to engage the next stop 119.

*Stage 8—Relay 162 drops out.*—On the expiration of its time-delay period, relay 162 drops out, opening contacts 162A, and closing normally-closed contacts 162C in series with the reject solenoid 90. At the same time, relay 162 opens normally-open contacts 162B in series with relay 163, starting a time-delayed opening of this relay.

Since contacts 163A are maintained closed a short time after the opening of relay 162, the circuit to the reject solenoid 90 is complete at this time, and the reject solenoid 90 is actuated, ejecting the undesired container from the conveyor.

Upon the expiration of the time delay of relay 163, this relay also drops out, opening contacts 163A, and returning the entire circuit to its original condition as at Stage 2, ready for the beginning of another test cycle.

Figure 11:
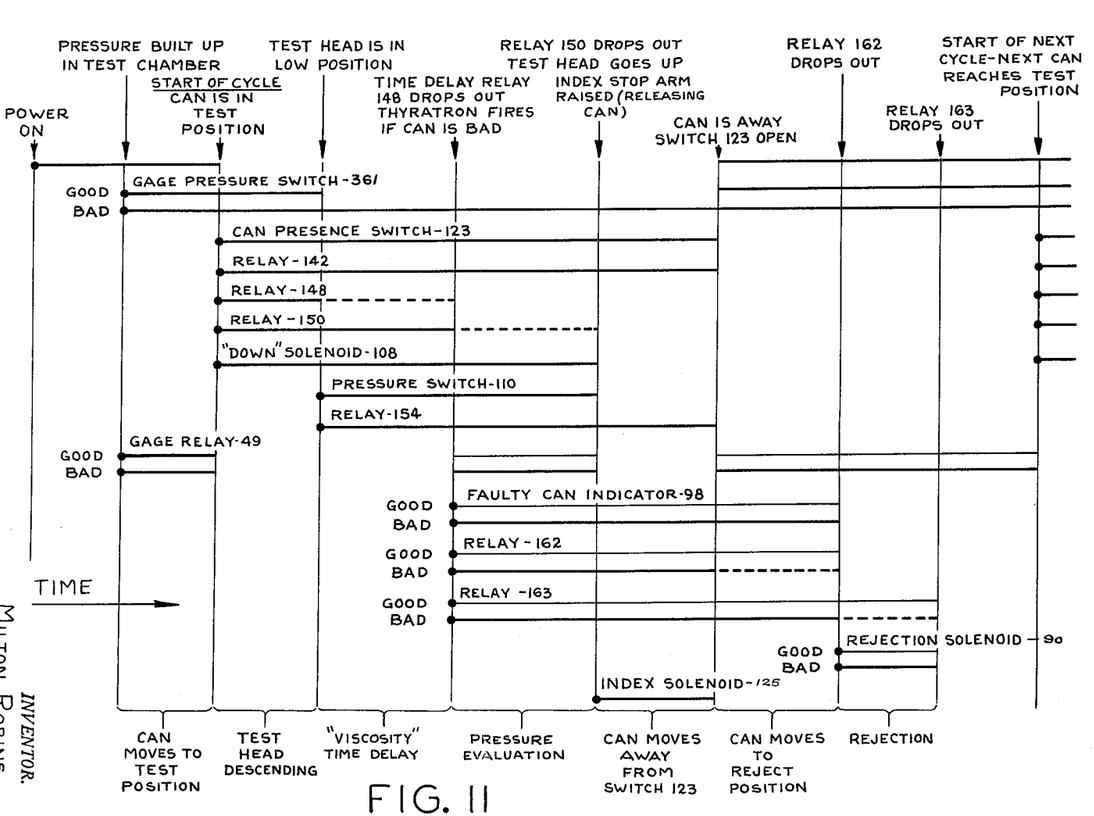
FIG. 11 is a time-sequence chart of the operation of the system according to FIGS. 7–10.
Figure 12:
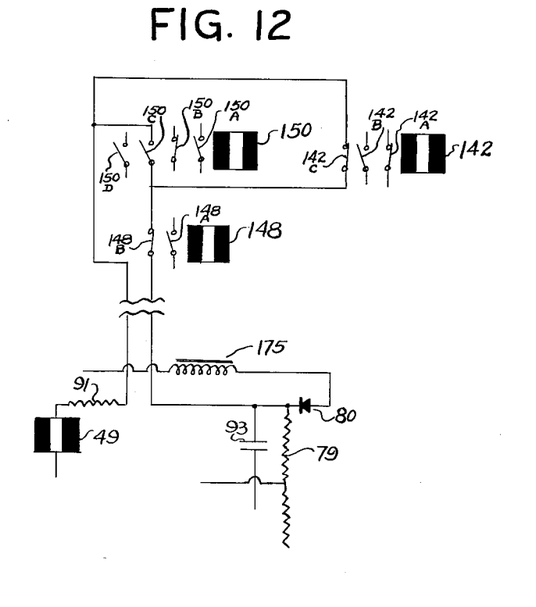
FIG. 12 is a circuit diagram of an alternate form of a portion of the circuit of FIG. 10.

An alternate plate circuit control arrangement for the thyratron 77 is shown in FIG. 11. According to this arrangement, the contacts 150C and 142C of the previous circuit are re-arranged so as to be connected in parallel with each other, and this combination is then connected in series with the contacts 148B. In operation, the plate circuit is initially closed, as in the former case, and is opened when the relay 142 is energized, by the opening of contacts 142C, these contacts remaining open during the remainder of the testing and evaluation cycle. As in the previous circuit, the relay 148 must be open, closing normally closed contacts 148B, and relay 150 must be closed, closing normally open contacts 150C, in order for the plate circuit to be complete.

The foregoing description of the control circuit illustrated in FIG. 10 is based on the use of a test head of the type shown in detail in FIG. 9, wherein the preload test-gas pressure is developed and trapped in the head before actual pressure communication takes place between the interior of the test head and the container to be tested. That control circuit, however, is equally serviceable with the type of test head illustrated in FIG. 3, in which test gas (of preset minimum pressure slightly below desired container pressure) is caused to flow through the head, passing through and unseating check valve 35, cleaning out the passages of the head prior to its engagement with the valve stem of the container. The conversion of the circuit of FIG. 10 for use with test head 17 is effected simply by manually throwing switch 141 to its alternate position in which solenoid 18 is connected to sub-bus 146. In this arrangement, solenoid 18 will be energized as long as a can engages and closes switch 123. Test-gas system pressure will thus continue to pass through test-chamber 33 until communication is established with the pressure of the container undergoing test. If, as desired, the container pressure is above the preset minimum, reverse flow from the container back through the head is immediately prevented by check valve 35. If on the other hand the container pressure is below the preset minimum, test gas will flow into the container until pressure equilibrim is established. This equilibrium pressure will be the preset test-gas pressure, for all practical purposes, since the container volume is insignificant in comparison with that of the supply tank 111A. Thus the test will indicate a low-pressure or faulty container.

In the system described above in connection with FIGS. 7 through 12, the test-gas pressure may be supplied from the gassing manifold used in pressurizing the containers in the normal loading of the containers. If, by any chance, the gassing manifold pressure drops below limit, as determined by the setting of high-limit contact 363 of pressure gauge 361, relay 49 will not operate, and thus the entire system will "fail safe," that is, will prevent any further delivery or testing of containers at station P until the faulty condition has been corrected.

It will be seen from the foregoing that the systems of the invention are adapted to handle conditions where it may be desirable to have the test-gas pressure either above or below the desired container pressure. Each system has certain advantages, some of which may be more desirable when handling containers filled with one type of product than another, and it is important therefore that the test equipment be capable of ready adaptation to either condition of operation. The present invention permits this to be easily accomplished.

It will be noted further that mechanical or electrical failure of any component in the systems described hereinabove will result automatically in immediate shutdown of further operation. Thus the systems are self-proving or checking and "fail safe," guaranteeing that no faulty container will be allowed to pass and become commingled with "good" containers. The systems also provide means of warning an operator of the failure of any delivery of containers to the test station, or delivery in improper position at that point. And further, if a container, after test, should fail to leave the test station, the system will stop, indicating a malfunction, and will not repeatedly test the same container over-and-over again.

While I have shown only certain particular embodiments of my invention, it will be readily apparent that many modifications thereof may be made by those skilled in the art without departing from the basic scheme of the invention, and I therefore intend by the appended claims to cover all such modifications as fall within the true spirit and scope of the invention.

What is claimed is:

1. The method of testing pressure in a closed prepressurized container containing a gas at ambient temperature but unknown pressure greater than atmospheric, which comprises the steps of confining a test gas in a fixed volume at ambient temperature and at predetermined pressure greater than atmospheric, which fixed volume is small in comparison to that of the gas in the container to be tested, then bringing said test gas into pressure-responsive communication with said container gas, maintaining said pressure-responsive communication for a period of time sufficient to allow the pressure of said test gas to reach equilibrium with said container gas pressure, and measuring the resultant pressure of said test gas.

2. The method of testing pressure in a closed prepressurized container containing a gas at ambient temperature but unknown pressure greater than atmospheric, the desired and expected range of pressure in said container being known, which method comprises the steps of confining a test gas in a fixed volume at ambient temperature and predetermined pressure, which fixed volume is small in comparison to that of the gas in the container to be tested, then bringing said test gas into pressure-responsive communication with said container gas, and measuring the resultant pressure of said test gas, said predetermined pressure of said test gas being at least as great as said desired and expected range of pressure, whereby the escape of pressure from said container is substantially completely prevented during said testing operation when said container has a pressure within said predetermined desired and expected range.

3. The method of testing the relation of pressure in a closed container of predetermined volume to a predetermined desired pressure, said container containing a substantially liquid substance and a gas and having an outlet provided with a closure and a tube extending from said outlet to a remote portion of said container, which method comprises the steps of positioning said container with said outlet uppermost, confining a test gas in a predetermined volume at predetermined pressure, then placing said test gas in pressure-responsive communication with said container gas through said outlet by temporarily opening said closure, and measuring the resultant pressure of said test gas, said predetermined volume and pressure of said test gas having a relation to said predetermined desired pressure in said container such that the presence of said predetermined desired pressure in said container causes said substance to be propelled along said tube toward said outlet a predetermined distance.

4. The method of testing the relation of pressure in a closed container of predetermined volume to a predetermined desired pressure, said container containing a substantially liquid substance and a propellant gas and having an outlet provided with a closure and a tube extending from said outlet to a remote portion of said container, which method comprises the steps of positioning said container with said outlet uppermost, confining a test gas in a predetermined volume at predetermined pressure, then placing said test gas in pressure-responsive communication with said container gas through said outlet, and measuring the resultant pressure of said test gas, said predetermined pressure of said test gas being less than said predetermined desired pressure in said container by an amount which in the case of a container having a pressure substantially equal to said desired pressure causes said substance to be propelled along said tube toward said outlet a predetermined distance.

5. Apparatus for testing pressure in a closed container having a valved outlet, comprising an enclosure having a test-gas chamber provided with an inlet and an outlet, an adapter head having an opening for communication with said test-gas chamber outlet, means for moving said adapter head into gas-tight engagement with said container with said container outlet in communication with said opening, means for opening said test-gas chamber inlet to apply an external pressure to said chamber, means for closing said inlet after a predetermined pressure has been created in said chamber, means for opening said valved outlet of said container while said adapter head is in engagement with said container and for establishing pressure-responsive communication between said test-gas chamber and said container, and means for indicating the resultant pressure in said test-gas chamber.

6. Apparatus for testing pressure in a closed container having a valved outlet at the top thereof, comprising a test-head assembly, means supporting said test-head assembly for vertical reciprocating movement, said test-head assembly comprising a housing having a test-gas chamber provided with an inlet and an outlet, valve means for closing said inlet, an adapter head adapted to engage said container in gas-tight relation as said test-head assembly is moved vertically downward on said container, said adapter head also including means for engaging said valved outlet of said container to open said outlet as said test-head assembly is moved downwardly, a gas passageway extending from said adapter head to said test-gas chamber, and means for indicating pressure conditions in said test-gas chamber.

7. Apparatus for testing pressure in a closed container having a valved outlet at the top thereof, comprising a test-head assembly, means supporting said test-head assembly for vertical reciprocating movement, said test-head assembly comprising a housing having a test-gas chamber provided with an inlet and an outlet, said test-head assembly also comprising an adapter portion movable into gas-tight relation with said container, a gas passageway connecting said adapter portion and said test-gas chamber outlet, first valve means for closing said test-gas chamber inlet, second valve means for closing said test-gas chamber outlet, means for opening said container valved outlet and said second valve means after said adapter portion is in gas-tight relation with said container, and means for indicating pressure in said test-gas chamber.

8. Pressure-testing apparatus as set forth in claim 7, wherein said second valve means is located at the lower portion of said test-head assembly and is so constructed and arranged that downward vertical movement of said test-head assembly causes said valve means to engage and be operated by said valved outlet of said container.

9. Apparatus for automatically testing pressure in a series of containers having valved outlets, comprising a conveyor for said containers, a test-head assembly including a housing having a test-gas chamber therein and valve means associated with said chamber to admit and confine a fixed volume of gas at predetermined pressure, means for moving said test-head assembly into engagement with the valved outlet and establishing pressure-responsive communication between said test-gas chamber and one of said containers when brought to a predetermined location by said conveyor, normally-open pressure-responsive switch means disposed and arranged to be operated by resultant pressure in said test-gas chamber, rejection means normally set to eject said container at a predetermined location, and means operated by said pressure-responsive switch means when closed for disabling said rejection means for a predetermined length of time to allow the container tested to pass said ejection location.

10. Apparatus for automatically testing pressure in a series of containers having valved outlets, comprising a conveyor for said containers, a test-head assembly including a housing having a test-gas chamber therein and valve means associated with said chamber to admit and confine a fixed volume of gas at predetermined pressure, means for moving said test-head assembly into engagement with the valved outlet and establishing pressure-responsive communication between said test-gas chamber and one of said containers when brought to a predetermined position by said conveyor, pressure-responsive switch means disposed and arranged to be operated by resultant pressure in said test-gas chamber, rejection means for ejecting said container from a predetermined location, said pressure-responsive switch comprising a movable contact and first and second stationary contacts, said movable contact being movable in response to pressure in said test-gas chamber whereby when said test-gas chamber pressure is below a predetermined first pressure said movable contact is in contact with said first stationary contact and when said pressure in said test-gas chamber is above a second predetermined pressure said movable contact is in contact with said second stationary contact and when said test-gas chamber pressure is between said first and second predetermined pressures said movable contact is out of contact with both said first and second stationary contacts, and means operated by said pressure-responsive switch when said movable contact is in contact with either said first or said second stationary contact for energizing said rejection means.

References Cited in the file of this patent
UNITED STATES PATENTS

| | | |
|---|---|---|
| 900,324 | Swangren | Oct. 6, 1908 |
| 1,845,362 | Tevander | Feb. 16, 1932 |
| 1,873,602 | Kruse | Aug. 23, 1932 |
| 1,971,065 | Dieter | Aug. 21, 1934 |
| 2,013,402 | Cameron | Sept. 3, 1935 |
| 2,407,062 | Darrah | Sept. 3, 1946 |
| 2,606,657 | Berthelsen | Aug. 12, 1952 |
| 2,711,645 | Burchette et al. | June 28, 1955 |
| 2,743,604 | Stein | May 1, 1956 |
| 2,863,316 | Abplanalp | Dec. 9, 1958 |